United States Patent Office

3,247,381
Patented Apr. 19, 1966

3,247,381
METHOD OF CHLORINE LOGGING IN A NON-FERROUS ENVIRONMENT
Richard L. Caldwell and George N. Salaita, Dallas, Tex., assignors to Socony Mobil Oil Company, Inc., a corporation of New York
Filed Dec. 29, 1960, Ser. No. 79,453
1 Claim. (Cl. 250—83.3)

This invention relates to radioactive well logging and more particularly to improved methods of and apparatus for distinguishing between salt water and oil present in subsurface formations and has for an object the increase in the sensitivity of and in the reliability of logging systems applicable to distinguish between chlorine and oil.

The use of a neutron source and gamma-ray detector for chlorine logging is well known and now extensively used. A typical system will employ fast neutrons thermalized by oil in a cased borehole for capture by chlorine and other nuclei in the formation. The capture gamma rays are detected and recorded with respect to depth. In some instances there are recorded only those gamma rays having energies in excess of 5 m.e.v. With such an arrangement it becomes difficult to distinguish between oil and salt water since in the environment in which the system operates there is present interference as between gamma rays emitted from different nuclei but of like energy. Further, the lack of an upper limit for energy detection reduces sensitivity since the intensities of gamma-ray energies from both salt-water and oil-saturation of a rock formation penetrated by an iron or steel cased borehole very nearly coincide beyond an upper energy level, for example, 6.3 m.e.v.

In accordance with the present invention, the sensitivity of a logging system suitable for chlorine logging is substantially increased to enable discrimination as between salt-water-saturated formations and oil-saturated formations by limiting the range of recorded gamma rays to energies of from about 4.6 m.e.v. to about 6.3 m.e.v.

We have also found that the environment in which a chlorine log is run is a major contributor to the lack of sensitivity. Boreholes are today cased with steel or iron casing, and invariably the tool housing providing a fluid-tight support for the neutron source and gamma-ray detector is made of iron. We have found that the predominant energies of both iron and chlorine capture gamma rays substantially coincide. Therefore, it is difficult to determine the respective contributions of chlorine nuclei and iron nuclei to the intensity of the detected gamma-ray signal.

In accordance with another aspect of the present invention, there is provided a method of determining the presence of chlorine in formations adjacent a borehole comprising the steps of establishing immediately adjacent the neutron source and the gamma-ray detector a nonferrous environment. While maintaining this environment, the source and detector are moved through the borehole to bombard the formations where the neutrons are reduced to thermal energy levels for capture by elements including chlorine in the formations. Prompt gamma rays resulting from the bombardment are detected and those gamma rays having energies in excess of 2.3 m.e.v. are recorded as a function of borehole depth.

In one system capable of performing the above method, the nonferrous environment is provided by making the housing of the logging tool at least in part of aluminum. Preferably, the well casing is also made of aluminum.

Where the wellbore has been cased with an iron casing, it is preferred to record as a function of borehole depth the intensity only of those gamma rays having energies lying in the range of from about 4.6 m.e.v. to about 6.4 m.e.v.

The method of the invention may be carried out by way of a logging system comprising a neutron source and a detector of gamma radiation. The source and detector are supported and moved through the borehole in predetermined spaced relationship by means including a nonferrous, fluid-tight housing which minimizes the intensity of neutron capture gamma rays characteristic of iron which lie in the energy band common to gamma rays resulting from capture of neutrons by chlorine nuclei. The nonferrous material may be selected from the class consisting of aluminum, magnesium, zirconium, and beryllium.

For further objects and advantages of the invention and for a more complete understanding thereof, reference may now be had to the following detailed description taken in conjunction with the accompanying drawings in which:

FIG. 1 diagrammatically represents a logging system embodying the present invention;

Figures 1, 2:
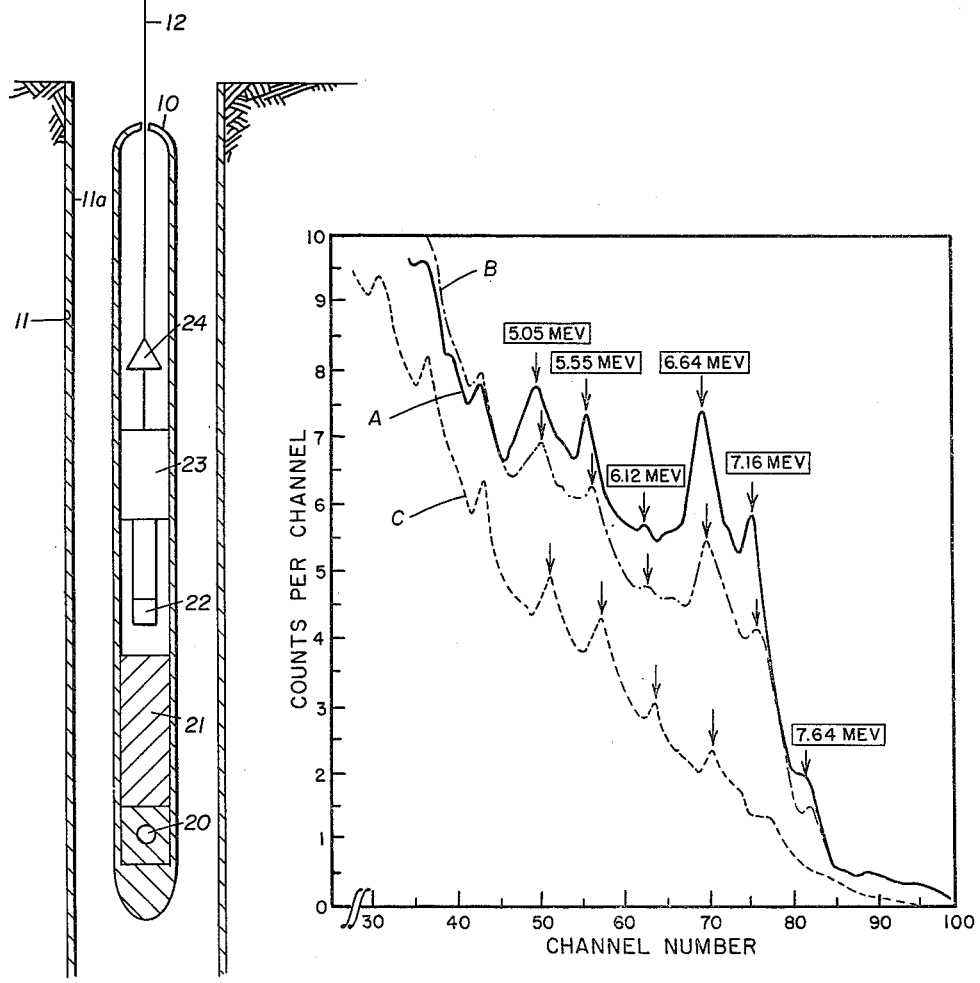
FIG. 2 is a plot of the intensities of chlorine capture gamma rays and iron capture gamma rays over the energy band of interest and illustrating the minimization in the effect of the iron capture gamma rays by practice of the present invention.

Referring now to FIG. 1, there is illustrated a well logging system embodying the present invention and including a pressure-resistant, fluid-tight housing 10 containing elements of a downhole exploring unit. The housing 10 and its contents are supported for movement along a wellbore 11 by a cable 12 driven by a power reel 13. A cable measuring element 14 connected by coupling 15 to a recorder 16 is provided to drive a recording medium in the recorder such that the length of the recording medium is proportional to the depth of the exploring unit. The elements within the housing 10 are standard and well known in the art for the production of a chlorine log. For example, the housing includes a source 20, preferably a gamma-free source of neutrons whose average energy is about 4 m.e.v. A nonferrous shield 21 separates source 20 from a detecting crystal 22 to eliminate direct transmission of radiation as between the source and detector. The crystal 22 is positioned adjacent a photomultiplier tube 23 whose output is connected by way of amplifier 24 and cable 12 to the earth's surface.

A measuring circuit 25 is connected between the cable on reel 13 and the recorder 16. The measuring circuit 25 preferably is designed to discriminate pulse heights so that the energy of individual gamma rays impinging crystal 22 may be recorded. But more important, and in accordance with one aspect of the present invention, it is desired that the measuring circuit 25 eliminate from the measurement any gamma radiation pulses outside a predetermined band. It will be understood that the measuring circuit 25, or pulse height discriminator, alternatively may be located downhole within the housing 10.

As is well known in the art, the neutrons emitted from the source 20 must be thermalized in order for radiative capture to occur. The thermalizing process is primarily caused by elastic scattering by light nuclei, for example, hydrogen. After being thermalized, the neutrons are absorbed by nuclei of surrounding elements to form excited nuclei which then decay immediately by emission of gamma rays. The gamma rays emitted by the capture of slow neutrons are characteristic of the capturing element. Because chlorine has a large capture cross section and the captured gamma rays have a characteristic energy spectrum, it is possible to detect the presence of chlorine in formations adjacent the borehole. However, ferrous metal, such as iron, the primary element in casing and in logging tools, produces neutron capture gamma rays whose energies overlap those of chlorine capture gamma rays. Therefore in the absence of the present invention, there is produced as illustrated in FIG. 2, an intensity versus energy curve A. It will be observed that there are several high energy peaks present. They are at 5.05 m.e.v.; 5.55 m.e.v.; 6.12 m.e.v.; 6.64 m.e.v.; and 7.16 m.e.v. The peaks at 5.05 m.e.v.; 5.55 m.e.v.; and 6.64 m.e.v., all constituting the highest intensity peaks, are due to a contribution from both chlorine and iron.

The observed occurrence of iron and chlorine peaks at the same energies is due, at least in part, to the nature of the sodium-iodide crystal employed as a detector where the predominant effect in detection of gamma rays of energy above 2 m.e.v. is pair production. As is well known, three different energies are surrendered in a typical crystal as a result of pair production. The three energy peaks are produced by one escape, two escape, and no escape photons. This effect is summarized in Table A below where the predicted energy values agree to within ±0.1 m.e.v. with the measured energies shown in FIGS. 2–4. This is well within the limit of accuracy of present instrumentation.

TABLE A

| | Gamma Ray Energy | Predicted Energy of Detected Peaks | | |
|---|---|---|---|---|
| | | No Escape | One Escape | Two Escape |
| Chlorine | 6.12 | 6.12 | 5.61 | 5.10 |
| | 6.64 | 6.64 | 6.13 | 5.62 |
| | 7.41 | 7.41 | 6.90 | 6.39 |
| Iron | 5.93 | 5.93 | 5.42 | 4.91 |
| | 6.03 | 6.03 | 5.52 | 5.01 |
| | 7.64 | 7.64 | 7.13 | 6.62 |

Now it can be seen why the effect of an iron environment upon chlorine logging is to obscure, due to iron capture gamma rays, the identification of and the quantitative intensity measurement of chlorine capture gamma rays. Thus, it is difficult to determine the relative contributions of chlorine and iron. As a result, a log resulting from the integration of all energies above a predetermined energy leaves much to be desired in the way of an accurate determination of the presence of chlorine nuclei.

In accordance with the present invention, the housing 10 of the exploring unit, or at least a part thereof, is made of a nonferrous material so as to minimize the intensity of iron capture gamma rays impinging upon the crystal 22. The resultant plot of intensities versus energy of capture gamma rays is illustrated in plot B of FIG. 2 where it is observed that, all other things being equal, the contribution by iron has been materially reduced and therefore a log of intensities is more accurately descriptive of the presence or absence of chlorine nuclei. The reduction in the contribution of iron is verified by comparison of the amplitudes of the 7.16 m.e.v. peaks of curves A and B. The 7.16 m.e.v. peak is due solely to iron capture gamma rays and is shown materially reduced in amplitude where the housing is, at least in part, aluminum.

In order to attain optimum results, it is, of course, desirable to provide a nonferrous casing 11a for the wellbore 11 and thus further to remove and, in fact, to eliminate the effect of iron capture gamma rays. Such an optimum result appears as plot C in FIG. 2 where the contributions to intensities at 5.05 m.e.v.; 5.55 m.e.v.; 6.12 m.e.v.; and 6.64 m.e.v. are due solely to chlorine capture gamma rays.

Where the housing 10 and other components of the exploring unit also are comprised of a nonferrous material, an accurate log may be produced by presetting the measuring circuit 25 to accept the intensities of those gamma-ray energies exceeding the energy of hydrogen capture gamma rays. The energy of hydrogen capture gamma rays is 2.23 m.e.v., and thus the contribution from the hydrogen capture gamma rays may be eliminated by biasing the measuring circuit 25 at approximately 2.3 m.e.v.

It is appreciated that many old wells are today being logged again to distinguish between salt-water-saturated formations and oil-saturated formations and that these wells have been cased with an iron or ferrous metal casing. We have found that logging instruments of the prior art, that is, those instruments employing ferrous metal housings, may be useful even in the logging of the above-described old wells where the measuring circuit 25 is biased to provide for measurement only of the gamma rays having energies falling within a selective interval, preferably from about 4.6 m.e.v. to about 6.4 m.e.v.

Figure 3:
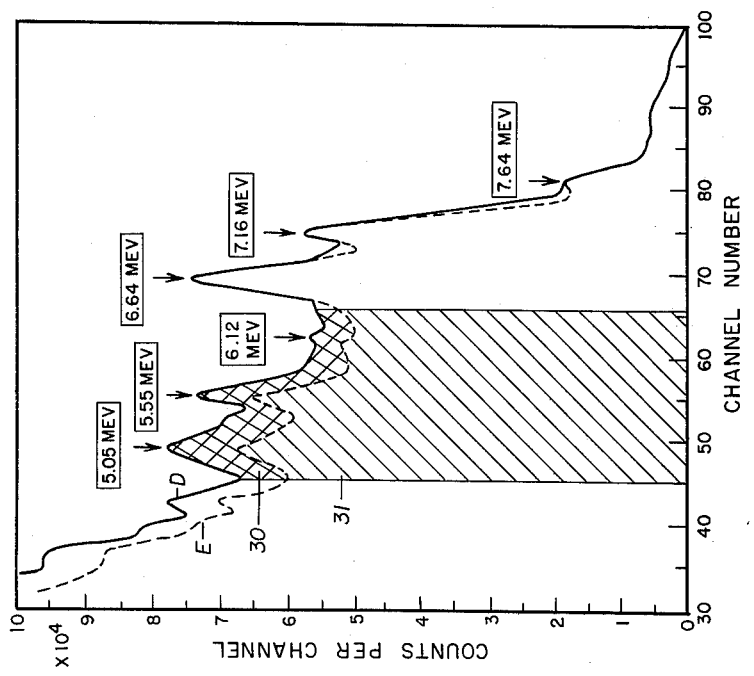
FIG. 3 is a plot illustrating the improved sensitivity resulting in the practice of one aspect of the present invention.

Referring now to FIG. 3, there is illustrated a plot of two curves D and E. Curve D represents the intensity versus energy of a salt-water-saturated formation obtained by employing an exploring unit comprised of iron elements and where the borehole has been cased with iron casing. Curve E represents the intensity versus energy spectrum of an oil-saturated formation taken under the same condition. It will be observed that where the intensities of all gamma-ray energies in excess of 5 m.e.v. are measured, the sensitivity, that is, the ability to distinguish between an oil-saturated formation and a salt-water-saturated formation, leaves much to be desired. This is due to the fact that at a point in excess of approximately 6.4 m.e.v. the curves D and E substantially coincide; and, therefore, if we take the percentage difference between the curves D and E over the spectrum in excess of 5 m.e.v., we find such difference to be approximately 7 percent. The sensitivity under like conditions, that is, the same exploring unit and environment, is doubled in accordance with the present invention by biasing the measuring system to pass only the intensities of gamma rays within the energy spectrum of from about 4.6 m.e.v. to about 6.4 m.e.v., but preferably between 4.6 m.e.v. and 6.2 m.e.v. The difference in the areas 30 and 31, respectively, under the curves D and E is emphasized by the double cross-hatched area. The ratio between the areas within the selected energy limits produces an effective sensitivity of at least 14 percent or twice the sensitivity resulting from present methods.

The sensitivity of the system is trebled in accordance with the present invention by employing with band-pass energy discrimination nonferrous materials in those portions of the logging tool normally effective to give rise to iron capture gamma rays.

Figure 4:
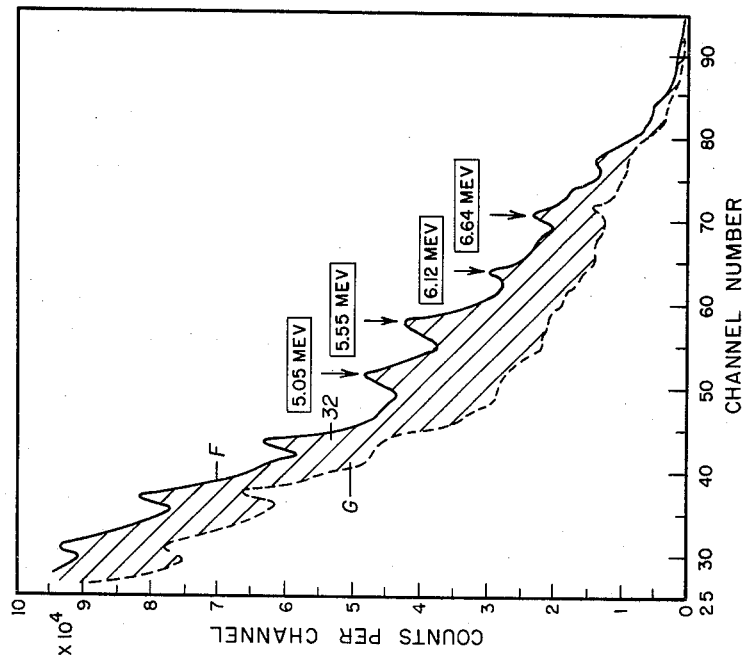
FIG. 4 is a plot illustrating further improvements in sensitivity resulting from the practice of another aspect of the present invention.

An even more astounding improvement in sensitivity occurs where the chlorine log is run in an environment substantially free of ferrous metals. Such an environment, of course, can be provided by employing an exploring unit substantially free of ferrous metals and a well casing material which is nonferrous. The results of logging in such an environment are illustrated in FIG. 4 wherein the curve F represents the intensity versus energy spectrum for a salt-water-saturated formation, and the curve G represents the intensity versus energy of an oil-saturated formation. It will be observed from the cross-hatched area 32 that a ratio of the areas under the respective curves provides a substantial figure. Specifically, this figure is approximately 65 percent. Thus, an almost tenfold improvement in sensitivity occurs employing the teaching of our invention over that of the present systems.

The improved sensitivities resulting from practice of the present invention are summarized in Table B below.

TABLE B

Energy bias (m.e.v.):     Chlorine-oil index (percent)
(1) Iron tool—iron casing —
>2.3 ------------------------------ 6
>5 ------------------------------ 7
4.6–6.3 ------------------------------ 14
(2) Aluminum tool—iron casing—
>2.3 ------------------------------ 9
>5 ------------------------------ 14
4.6–6.3 ------------------------------ 20
(3) Aluminum tool—aluminum casing—
>2.3 ------------------------------ 20
>5 ------------------------------ 67
4.6–6.3 ------------------------------ 64

In the practice of the methods of the present invention, the crystal-detector 22 and the source 20 may be supported for movement within the wellbore 11 by means comprised entirely of nonferrous metal. The metals may be selected from the group consisting of aluminum, magnesium, zirconium, and beryllium. On the other hand, it is understood that, depending upon the length of the exploring unit as represented by the housing 10, only selected portions need be made of nonferrous metals. Certainly, the portion between the source 20 and the crystal-detector 22 need be made of nonferrous metal as well as the portion of the equipment immediately above the crystal-detector 22 and the portion of the equipment immediately below the source 20. The extent to which the nonferrous portion extends beyond the crystal-detector 22 and the source 20 is, of course, a matter of choice; and, therefore, it is to be understood that the use of the phrase "adjacent to" as employed in the claims is meant to cover an exploring unit comprised of the nonferrous metal to the extent necessary substantially to minimize the effect of iron capture gamma rays upon the signal received at the crystal-detector 22.

In one embodiment of the present invention, the source 20 was a capsuled neutron source of the plutonium-beryllium type. Another suitable source is polonium-beryllium. Both-named sources are substantially gamma free. The shield 21 for shielding the direct neutron beam from the source 20 was of tungsten metal, and the photomultiplier instrumentation 23 included a Du Mont Photo-multiplier, Type 6292.

Having described the invention and various modifications thereof, it will be understood that further modifications may now suggest themselves to those skilled in the art and it is intended to cover all those as fall within the scope of the appended claim.

What is claimed is:

The method of logging a borehole for the production of a record which distinguishes between salt water saturated formations and oil saturated formations by the detection of pulses due to the capture of thermalized neutrons by chlorine in the absence of pulses due to neutron capture by iron, which comprises moving along a borehole a non-ferrous casing enclosing a source of neutrons in fixed space relation with a detector responsive to gamma rays due to neutron capture, thermalizing the neutrons from said source after emission from said source so that radiative neutron capture will occur in the presence of chlorine and will through such capture give rise to gamma rays of differing energy levels, in response to the output of said detector, generating a plurality of pulses due to the capture of gamma rays with energy levels falling within the range of 4.6 to 6.4 m.e.v. during the time said neutron source and its associated detector are being moved along the borehole in a region in which there is absent iron casings and the like thereby to eliminate from the response of said detector pulses within the aforesaid range due to neutron capture of iron, and recording as a function of borehole depth said pulses within said range for the production of a record from which there may be determined the formations which are salt water saturated and those which are oil saturated.

References Cited by the Examiner

UNITED STATES PATENTS

| | | | |
|---|---|---|---|
| Re. 24,383 | 10/1957 | McKay | 250—83.3 |
| 2,554,844 | 5/1951 | Swift | 250—83.6 |
| 2,705,289 | 3/1955 | Youmans | 250—83.6 |
| 2,862,106 | 11/1958 | Scherbatskoy | 250—71.5 |
| 2,905,826 | 9/1959 | Bonner et al. | 250—83.3 |
| 2,910,591 | 10/1959 | Baker | 250—83.3 |
| 2,938,119 | 5/1960 | McKay | 250—43.5 |
| 2,949,535 | 8/1960 | Scherbatskoy | 250—83.6 |
| 2,956,163 | 10/1960 | Baker | 250—83.6 |
| 2,971,094 | 2/1961 | Tittle | 250—83.6 |
| 2,983,817 | 5/1961 | Earley et al. | 250—83.3 |
| 3,090,867 | 5/1963 | Swanson et al. | 250—83.6 |
| 3,108,188 | 10/1964 | Dewan et al. | 250—83.3 |
| 3,139,528 | 6/1964 | Johnson | 250—83.6 |

RALPH G. NILSON, *Primary Examiner.*

ARCHIE R. BORCHELT, *Examiner.*